(No Model.) 2 Sheets—Sheet 1.
F. TIEDT, Sr.
CAR COUPLING.
No. 374,717. Patented Dec. 13, 1887.
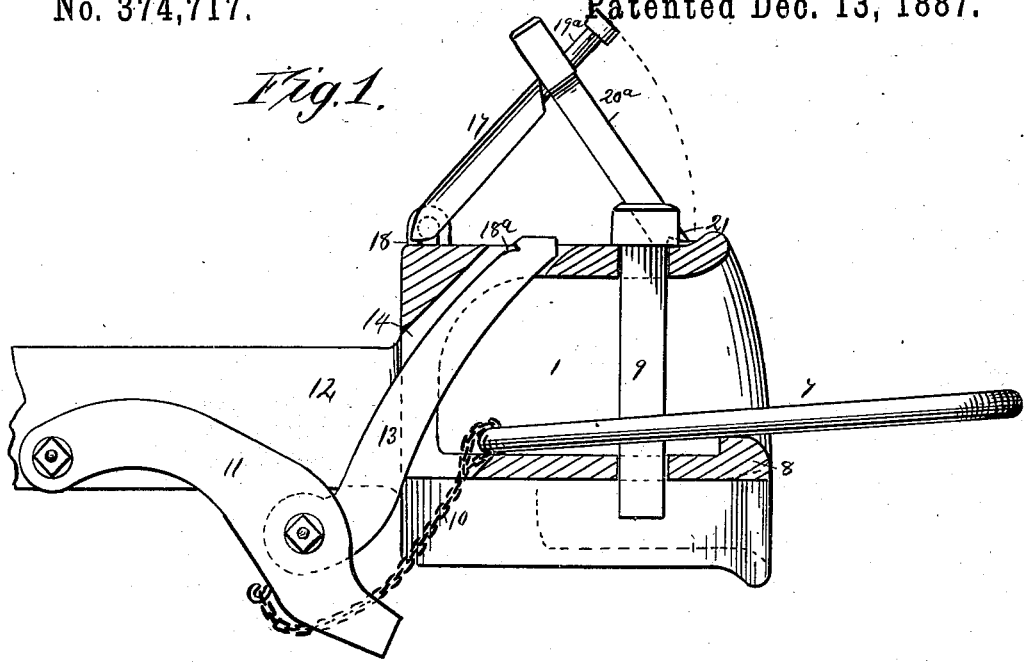
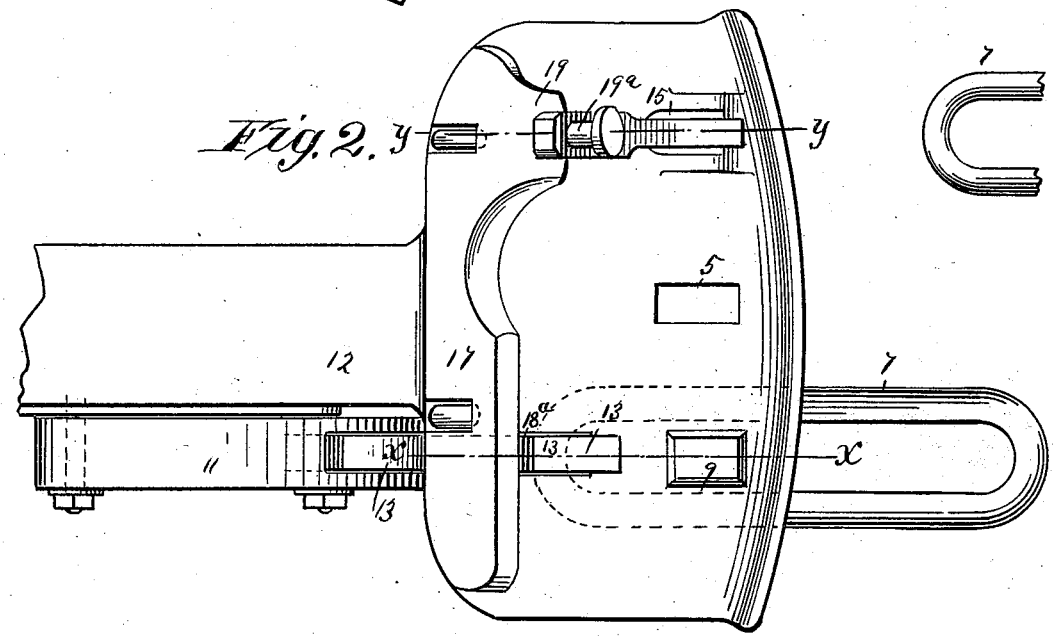
WITNESSES:
J. D. Garfield
C. Sedgwick
INVENTOR:
F. Tiedt Sr.
BY Munn & Co.
ATTORNEYS.

(No Model.) 2 Sheets—Sheet 2.

F. TIEDT, Sr.
CAR COUPLING.

No. 374,717. Patented Dec. 13, 1887.

WITNESSES:
J. D. Garfield
C. Sedgwick

INVENTOR:
F. Tiedt, Sr.
BY Munn & Co.
ATTORNEYS.

UNITED STATES PATENT OFFICE.

FRED TIEDT, SR., OF EUCLID, MINNESOTA.

CAR-COUPLING.

SPECIFICATION forming part of Letters Patent No. 374,717, dated December 13, 1887.

Application filed April 16, 1887. Serial No. 235,061. (No model.)

*To all whom it may concern:*

Be it known that I, FRED TIEDT, Sr., of Euclid, in the county of Polk and State of Minnesota, have invented a new and Improved Car-Coupling, of which the following is a full, clear, and exact description.

My invention relates to an improvement in car-couplings, and has for its object to provide a double coupler which will automatically couple with an opposing coupler of like pattern, and wherein provision is made for coupling with the ordinary link draw-head without changing the links or interfering in the least with the arrangement of the improvement.

The invention consists in the construction and arrangement of the several parts, as will be hereinafter fully set forth, and pointed out in the claims.

Reference is to be had to the accompanying drawings, forming a part of this specification, in which similar figures of reference indicate corresponding parts in all the views.

Figure 3:
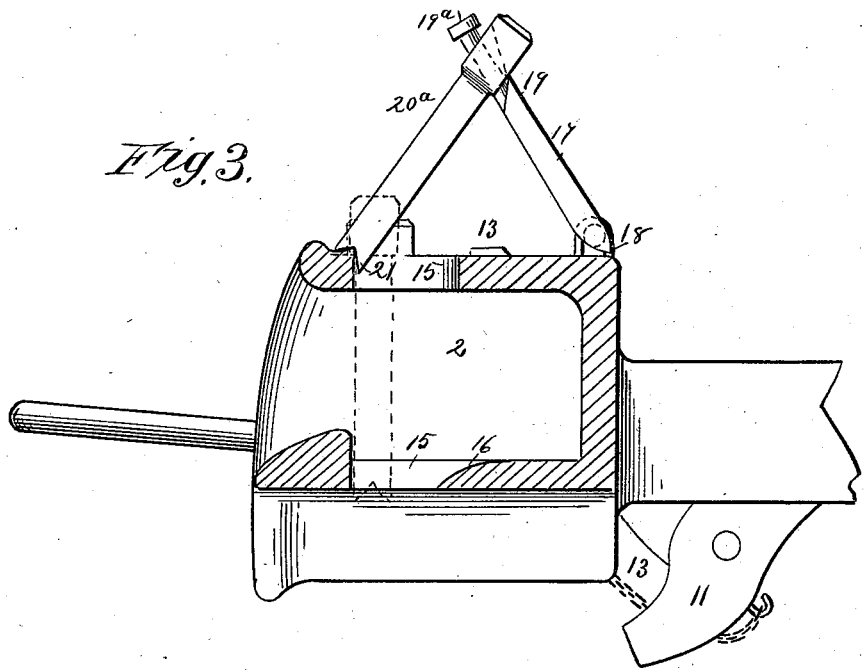
Figure 4:
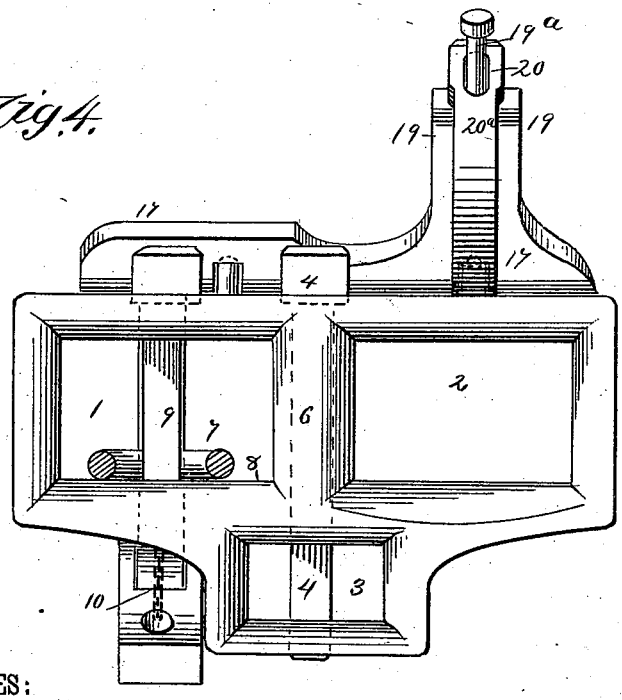

Figure 1 is a transverse section through the draw-head on line $x$ $x$ of Fig. 2. Fig. 2 is a plan view of the same. Fig. 3 is a transverse sectional view on line $y$ $y$ of Fig. 2, and Fig. 4 is a front elevation.

The draw-head is constructed with three independent link-openings, 1, 2, and 3. The link-openings 1 and 2 are arranged horizontally side by side in the draw-head, the opening 2 being preferably larger than the opening 1, and the face of the draw-head surrounding said opening is made to slant upward and back to clear an opposing draw-head. Centrally below the said openings 1 and 2 the third link-opening, 3, is formed in the draw-head, which opening is adapted for use with an opposing draw-head carrying the ordinary link and pin. The pin 4, for coupling the link, is entered from the top through an aperture, 5, extending vertically through the partition 6, dividing the aforesaid openings 1 and 2, and also through an aligning aperture in the bottom of the opening 3 itself, as shown in Fig. 4.

The opening 1 is adapted to contain a stationary link, 7, of the usual form, and is provided with a sill, 8, whereby the link is retained in a substantially elevated position, as shown in Fig. 1. A pin, 9, is entered through the opening and link, near the front of the former from the top through the draw-head, which pin is adapted to act as an auxiliary tie for the link, the said link being primarily held in position by a chain, 10, attached to the inner end thereof, passing down through an aperture in the rear of the link-opening 1 to an engagement with a draw-block, 11, pivoted at its inner end to the side of the draw-bar 12, as shown in Fig. 1, the connection being effected by passing said chain through an aperture in the forward end of the draw-block to prevent tangling, and securing the said chain in any suitable manner to the under side of the block.

The purpose of the draw-block is to draw the coupling-link to a proper position for coupling again when detached from the opposing coupler. A more or less crescent-shaped sliding bar, 13, is pivoted near the outer end of the draw-block 11, which, extending upward, has play within the link-opening 1, and also in an inclined aperture, 14, formed in the draw-head.

The link-opening 2, adapted to receive the link of the opposing coupler, is provided with a pin-aperture, 15, in top and bottom, the lower aligning aperture being formed with an inclined rear edge, 16, whereby the coupling-pin is made under all circumstances to enter the proper aperture.

A guide-frame, 17, is hinged longitudinally to the top of the draw-head at the rear, being provided with a flat under surface adapted to lie close to the draw-head, and a beveled rear edge, 18, whereby the upward movement of said guide-frame is limited. The forward edge of the frame 17, over the link-opening 1, is adapted to engage a notch, $18^a$, in the sliding bar 13, whereby the draw-block is held in an elevated position when the cars are coupled. The frame 17 is provided upon its forward end, centrally over the link-opening 2, with a forwardly-inclined projection, 19, having a central annular headed pin, $19^a$, adapted to enter an oblong aperture, 20, in the coupling-pin $20^a$ and support said pin. The coupling-pin $20^a$ is provided with a notched lower end, 21, adapted to engage the forward edge of the upper aperture, 15, as shown in Fig. 1. When the cars are idle, the coupling-pin may be turned upon its pivot-pin $19^a$ and laid longitudinally upon the top of the draw-head out of the way.

In operation, when the draw-heads come together, the stationary link 7 enters the link-opening 2, the shock causing the pin 20ᵃ to become disengaged from its position upon the draw-head and drop through the apertures 15 and the link. As the cars are drawn apart, the link draws up the pivoted block 11, causing the notch 18ᵃ in sliding bar 13 to engage the edge of the frame 17, whereby the link 7 is allowed ample play in said link-opening 2.

Having thus fully described my invention, I claim as new and desire to secure by Letters Patent—

1. In a coupler, a draw-head having three independent link-openings and a downwardly and forwardly inclined face, substantially as herein shown and described.

2. In a car-coupler, a draw-head having three independent link-openings of unequal size, two in horizontal alignment and one beneath and substantially intervening the said aligning openings, the larger of said openings being formed with an upwardly and inwardly inclined lower face, substantially as shown and described.

3. The combination, with a draw-head having independent link-openings, of a draw-block pivoted to the draw-bar to the rear of one opening and a link held in said opening attached to the said draw-block by a chain, substantially as shown and described.

4. The combination, with a draw-head having independent link-openings, of a draw-block pivoted to the draw-bar to the rear of one opening, a bar pivoted to said draw-block and sliding in said draw-head, a link held in said opening, attached to said draw-block by a length of chain, and a detachable pin passing through said opening and link, substantially as shown and described.

5. The combination, with a draw-head having independent link-openings and a guide-frame hinged above said openings, having pivoted thereto a coupling-pin, of a draw-block pivoted to the draw-bar to the rear of one opening, a bar pivoted to said draw-block, adapted to slide in said draw-head, a link held permanently in one opening and attached by a length of chain to said draw-block, and a detachable pin passing through said opening and link, substantially as herein set forth.

6. The combination, with a draw-head having a downwardly and forwardly inclined face and link-openings 1, 2, and 3, the latter opening having an upwardly and rearwardly inclined lower face, and a guide-frame, 17, hinged to the top rear edge of said draw-head, carrying a pivoted pin, 20, having a notched lower end above the link-opening 2, of a draw-block, 11, pivoted to the draw-bar to the rear of the opening 1, a bar, 13, adapted to slide in the draw-head and engage said frame, a link, 7, held permanently in the said opening 1 by a length of chain, 10, attached to said draw-block, and a detachable pin, 9, passing through said opening and link, substantially as herein set forth.

FRED TIEDT, Sr.

Witnesses:
M. BIVER,
M. E. KIRSCH.